United States Patent
Böhm et al.

(10) Patent No.: US 6,279,694 B1
(45) Date of Patent: Aug. 28, 2001

(54) SYSTEM FOR CONTROLLING OR ADJUSTING AN ELECTROMECHANICAL BRAKE

(75) Inventors: Jürgen Böhm, Oberneisen; Martin Semsch, Darmstadt; Jürgen Balz, Hünstetten; Karlheinz Bill, Dreieich; Peter Scheerer, Weiterstadt, all of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/043,266

(22) PCT Filed: Sep. 11, 1996

(86) PCT No.: PCT/EP96/03978

§ 371 Date: Jul. 2, 1998

§ 102(e) Date: Jul. 2, 1998

(87) PCT Pub. No.: WO89/03490

PCT Pub. Date: Apr. 20, 1989

(30) Foreign Application Priority Data

Sep. 30, 1995 (DE) .............................. 195 36 695

(51) Int. Cl.[7] .................................................. B60T 13/74
(52) U.S. Cl. .................... 188/162; 188/1.11 E; 303/20
(58) Field of Search ................... 188/161, 162, 188/163, 156, 1.11 E, 1.11 A; 303/20, 115.2

(56) References Cited

U.S. PATENT DOCUMENTS

| 4,508,196 | * | 4/1985 | Jamon | 188/1.11 |
|---|---|---|---|---|
| 4,658,939 | * | 4/1987 | Kircher et al. | 188/156 |
| 4,944,372 | * | 7/1990 | Taig | 188/156 |
| 4,995,483 | | 2/1991 | Moseley et al. . | |
| 5,125,483 | * | 6/1992 | Kitagawa et al. | 188/158 |
| 5,366,280 | * | 11/1994 | Littlejohn | 303/3 |
| 5,390,992 | * | 2/1995 | Walenty et al. | 303/112 |
| 5,423,600 | * | 6/1995 | Riddiford et al. | 303/3 |
| 5,829,557 | * | 11/1998 | Halasy-Wimmer et al. | 188/162 |
| 6,000,507 | * | 12/1999 | Bohm et al. | 188/158 |

FOREIGN PATENT DOCUMENTS

| 4021572 | 1/1991 | (DE) . |
|---|---|---|
| 0166670 | 1/1986 | (EP) . |
| 0170478 | 1/1987 | (EP) . |
| 89/03490 | 4/1988 | (WO) . |

* cited by examiner

Primary Examiner—Robert J. Oberleitner
Assistant Examiner—Bradley King
(74) Attorney, Agent, or Firm—Rader, Fishman & Grauer P

(57) ABSTRACT

There is the problem of adjusting a clearance in electromechanically or electromotively operated brakes because automatic resetting means, which are provided for hydraulic brakes, cannot be used in brakes of the above type.

Initially, it is necessary to determine a neutral position of the motor which is defined by the friction elements just abutting the brake disc in this position.

This situation is determined by a detection device which exhibits the following operation in one preferred embodiment. The motor is driven from an unknown position by a constant motor torque so that the friction linings are moved towards the brake disc. The motor will speed up because the resistances remain constant in the starting stroke. An abrupt deceleration of the motor will be caused when the friction linings are applied to the brake disc. The zero passage of the angular acceleration can be sensed and interpreted as an application of the friction linings on the brake disc. Subsequently, a so-called contact signal is generated, with the result that the motor is restored in a position-controlled manner by a defined angle which corresponds to the clearance being adjusted.

7 Claims, 3 Drawing Sheets

SYSTEM FOR CONTROLLING OR ADJUSTING AN ELECTROMECHANICAL BRAKE

This application is filed under 35 U.S.C. § 371 from International Application PCT/EP96/03978, with a filing date of Sep. 11, 1996, further claiming priority on German Application No. 195 36 695.6, filed Sep. 30, 1995.

BACKGROUND OF THE INVENTION

The present invention relates to a system for controlling or adjusting an electromechanical brake.

An electromotive brake with these features is described in U.S. Pat. No. 4,995,483. The system disclosed is used to decelerate aircraft, however, its principal structure is applicable on road vehicles as well. The brake includes a set of brake discs and an associated set of friction discs which are urged against each other by way of a clamping device. The clamping device is actuated electromotively by way of a spindle, which is driven by a roller thread drive and pressed against the outward friction disc. A force-measuring element is interposed between the first friction disc and the spindle head. A clearance is provided between the brake discs and the friction discs.

The general point is that to produce a brake force, first the clearance must be overcome. Only after the friction discs or friction elements abut on the brake discs is it possible to transmit a clamping force which causes deceleration of the wheel connected to the brake discs. To apply the friction discs on the brake discs, i.e., to overcome the clearance, only low forces are transmitted which should not exceed a defined limit value.

As soon as a limit value is exceeded, the system disclosed in the above U.S. patent interprets this fact as application of the friction discs on the brake discs.

The associated angular position of the driving electric motor is defined as the zero position.

To produce a clamping force, the motor can be readjusted by defined amounts of angle, and the interrelation between the readjustment of the motor based on the zero position and the clamping force exerted is taken into account.

When the brake is released, the spindle is initially restored until the zero position is reached. Subsequently, the spindle is reset by a further amount which corresponds to the clearance. This type of clearance adjustment is very inaccurate, and, in addition, it may only be effected during brake application. It is not possible to adjust the clearance independently of a braking operation.

The provision of a force sensor is absolutely necessary in the brake disclosed in the above-mentioned U.S. patent in order to be able to determine the neutral or zero position. The problem is that the signal of such force sensors is subjected to a drift so that it is only possible to determine the actual force exerted by using major electronic means. Therefore, the objective of development is to obviate the need for a sensor of this type and to derive the necessary data for brake application from the signals of other sensors, for example, a sensor which senses the wheel rotational speed.

However, this eliminates the possibility of performing the method of determination of the neutral position mentioned in the above U.S. patent.

Therefore, an object of the present invention is to provide a controlling or adjusting system which permits adjustment of a clearance even without the use of a force sensor.

Another object of the present invention is to provide a controlling or adjusting system to identify and readjust the clearance which operates independently of brake application and, in addition, permits readjusting the clearance even during travel of the automotive vehicle.

SUMMARY OF THE INVENTION

To be able to adjust the clearance and to actuate the brake in a defined fashion, it is necessary to detect in which angular position, i.e., neutral position, of the motor the friction elements are applied to the friction surface in order to define the neutral position.

The application of the friction element against the friction surface is determined during a so-called detection movement by means of a detection device. When the detection device produces a contact signal, the associated angular position of the driving electric motor can be defined as zero position or neutral position $\phi_0$. Subsequently, the friction lining is controlledly reset to a position where a previously defined clearance $\Delta\phi$ is maintained.

'Position control' means that the electric motor is actuated so that it rotates at an angular velocity which is predetermined by a controller. The controller calculates a nominal angular velocity value from the difference between the desired nominal motor angle value and the actual motor angle value prevailing. This way, the nominal clearance can be adjusted quickly and sensitively.

The detection device which determines whether the friction linings bear against the brake disc can be achieved in two ways.

One possibility involves actuating the electric motor with an approximately constant motor torque. To this end, the motor is driven by a constant nominal motor current value which produces an approximately constant motor torque in motors which are usually employed for actuating devices of this type.

It can be expected in this mode that the motor rotates at an increasing rate of angular velocity as long as the friction element is still in the clearance, i.e., is spaced from the friction disc. The application of the friction elements on the friction surface of the brake disc may now be determined as follows. The angular velocity and the angular acceleration of the motor shaft is observed while the clearance is overcome. The signals of a resolver are taken into account for this purpose. The signals of the resolver are also used to perform electronic commutation of the motor.

The motor torque is so adjusted that it only slightly exceeds the friction torque of the motor including the coupled mechanics. The remaining effective torque causes a low acceleration of the motor shaft and an accelerated approaching movement of the friction linings or elements in the direction of the brake disc. The result is that, after a previously unknown travel has been covered, the friction linings are applied with low force to the friction surface of the brake discs. The resulting load torque of the motor initially causes a reducing motor acceleration and, subsequently, deceleration (negative acceleration) of the motor angular velocity until standstill. Because the motor torque predetermined for this detection movement generates only a small motor acceleration torque, the application of the friction linings on the friction disc effects already an almost immediately occurring sign reversal of the motor acceleration.

The zero passage of the motor acceleration is used as a contact signal for applying the friction linings against the friction surface. The motor angle at the point of time of zero passage thus achieves the neutral or zero position of the motor.

Because the effective motor torque adopts a very small value only, the application of the friction linings on the friction surface will not produce any considerable deceleration of the wheel. Thus, the basic idea is to move the friction lining with low force against the friction surface, so that major forces which would cause deceleration of the vehicle are not transmitted upon application of the friction element on the friction surface.

A second possibility of realizing the detection device involves the provision of contact pins in the friction linings which, when applied to the brake disc, close a current circuit and thereby produce a contact signal in the detection device. The detection movement is position-controlled in this case, i.e., it is performed at a controlled angular velocity.

The contact pin arranged in the friction lining extends through the friction lining towards the brake disc and, therefore, is exposed to the same wear as the friction lining itself.

It is an advantage in both mentioned methods of determining the neutral position that there is no need for a force sensor.

The special advantage of the method of determining the neutral position, where the variation in the angular velocity of the motor is monitored, is that the signals of a rotation sensor can be used which is already provided and required for the electronic commutation of the motor.

When the detection device issues a contact signal, the friction lining in both methods is restored in a position-controlled fashion to a position where a previously defined clearance is maintained. In the return stroke, i.e., when the actual clearance is adjusted, the motor is so regulated that it rotates at an angular velocity which is predetermined by a controller. The controller calculates a nominal angular velocity value from the difference between the nominal motor angle desired and the actual motor angle. This way, the nominal clearance may be adjusted quickly and sensitively.

The idea of the present invention will be explained in detail hereinbelow by way of several Figures.

DETAILED DESCRIPTION OF THE DRAWINGS

Figure 1:
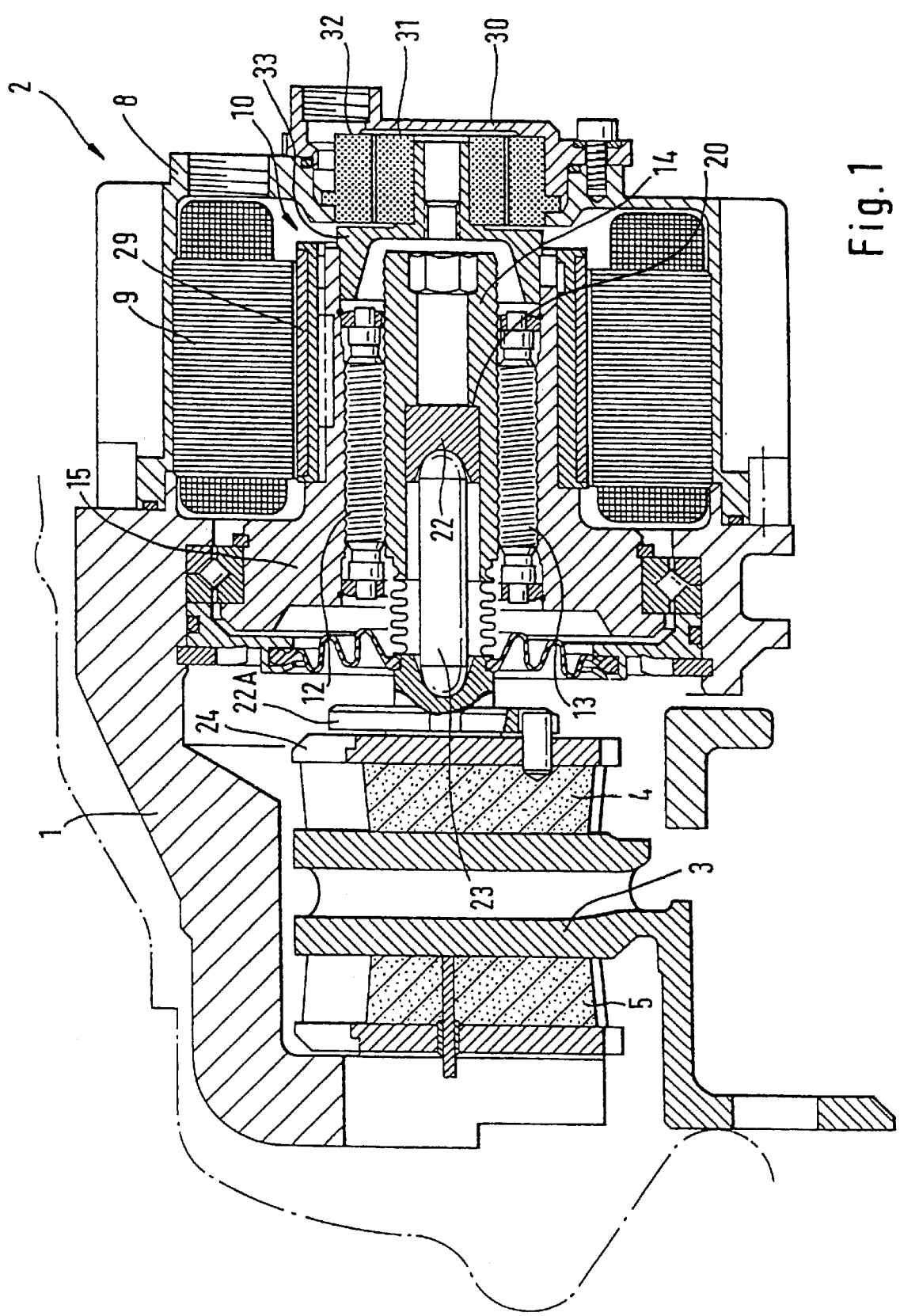
FIG. 1 is the typical structure of a wheel brake operated by an electric motor.

FIG. 1 shows an electromechanically operable floating-caliper disc brake. Of course, the actuation of the brake described hereinbelow may also be transferred to all other types of disc brakes and to drum brakes.

The floating-caliper disc brake includes a brake caliper 1 which is slidably mounted with respect to the brake disc 3, and an electric motor 2 having its housing 8 attached to the brake caliper 1. One friction lining 4, 5 is arranged on either side of the brake disc. The first friction lining 4 is supported on a spindle 14 which is driven by the electric motor 2, with the result that the lining can be pressed against the brake disc 3 by the electric motor 2. The second brake lining 5 is attached to the brake caliper 1 and pressed against the other side of the brake disc by reaction forces which are transmitted to the caliper 1 when the first lining 4 is applied to brake disc 3.

The electric motor 2 is a permanently energized, electronically commutatable motor having a stator 9 rigidly mounted in the housing 8. The stator 9 is configured as a coil system in a known fashion. Rotor 10 includes a hollow shaft 15 which is rotatable in the brake caliper. Several permanent magnetic segments 29 are arranged on the outside of the hollow shaft and rigidly connected with the hollow shaft 15. The magnetic field produced by the stator 9 interacts with the permanent magnetic field of the magnetic segments 29 and causes rotation of the hollow shaft 15. The rotation is transferred into an axial movement of the spindle 14 by a roller screw drive. To this end, the inside of the hollow shaft 15 and the outside of the spindle 14 each include a thread engaging into the thread of paraxial threaded rollers 12, 13.

The spindle 14 is configured as a hollow cylinder with an inward step 20. Bearing against step 20 is a spherical cup 22 on which a push rod 23 abuts. Rod 23, in turn, is supported with its other end on another spherical cup 22A which is anti-torsionally connected to a lining carrier 24 of the first friction lining 4.

Further, the motor 2 includes a so-called resolver 30. Resolver 30 has two rings 31, 32 which are coaxial to each other and separated by an air slot. The radially inward ring 31 is connected to the hollow shaft 15 by a retaining element 33. The radially outward ring 32 is connected to the housing 8. The signals of the resolver are used, on the one hand, to commutate the motor, i.e., to perform the energization of the stator 9 so that a traveling magnetic field is generated and, on the other hand, to determine the relative angular position of the rotor. Because the angular position of the rotor is directly linked to the axial position of the spindle, the signal of the resolver is also an indicator of the position of the spindle 14 in the brake caliper 1.

The brake described hereinabove is actuated by energization of the electric motor 2.

The brake must perform the following functions:
1. Apply the brakes
    This means that the friction linings 4, 5 are pressed against the brake disc with a defined force, the clamping force, so that the friction forces generated produce a brake torque which causes deceleration of the vehicle wheel connected to the brake disc 3. When the brake is applied, a nominal angular velocity is adjusted which is produced from the difference between a nominal deceleration signal and an actual deceleration signal so that the motor is acted upon by a current of a strength at which the desired angular velocity is achieved.
2. Release the brakes
    This means that the clamping force is decreased and, thus, adapted to the vehicle deceleration desired by the driver.
3. Adjust the clearance
    This means that the electric motor, after braking, must be actuated so that the brake linings 3, 4 maintain a distance from the brake disc. This distance is termed as 'clearance'. The purpose of maintaining a clearance of this type is to prevent the friction linings from rubbing against the brake disc when a braking effect is not intended.

As indicated in FIG. 1, the second friction lining 5 includes a contact pin which extends through the lining to the disc. A similar contact pin is provided for the first brake lining 4 which is not shown in FIG. 1. When the brake linings bear against the disc, as shown in FIG. 1, a conductive contact is made between the tips of the contact pins and the brake disc. A current circuit may so be closed, as will be explained hereinbelow.

The resolver 30 permits a relative angle measurement for the angular position of the rotor sleeve 15 and, thus, the position of the spindle 14. The design of the mechanics described in FIG. 1 does not provide for a direct technical measurement of the clearance. However, the relationship between the axial position of the spindle and the brake application force varies due to lining wear and thermal effects. Another problem is that the current clearance situation is absolutely unknown in the beginning when the actuation for the electromechanically operable brake is switched on. This necessitates determining the adjustment of the clearance immediately after the actuation is switched on. When the clearance is known, braking may be performed far more sensitively because the transition to proper braking can be effected at the correct angular position. The knowledge of the exact size of the clearance is necessary especially when the brake force to be exerted must be controlled rather than regulated.

Figure 2:
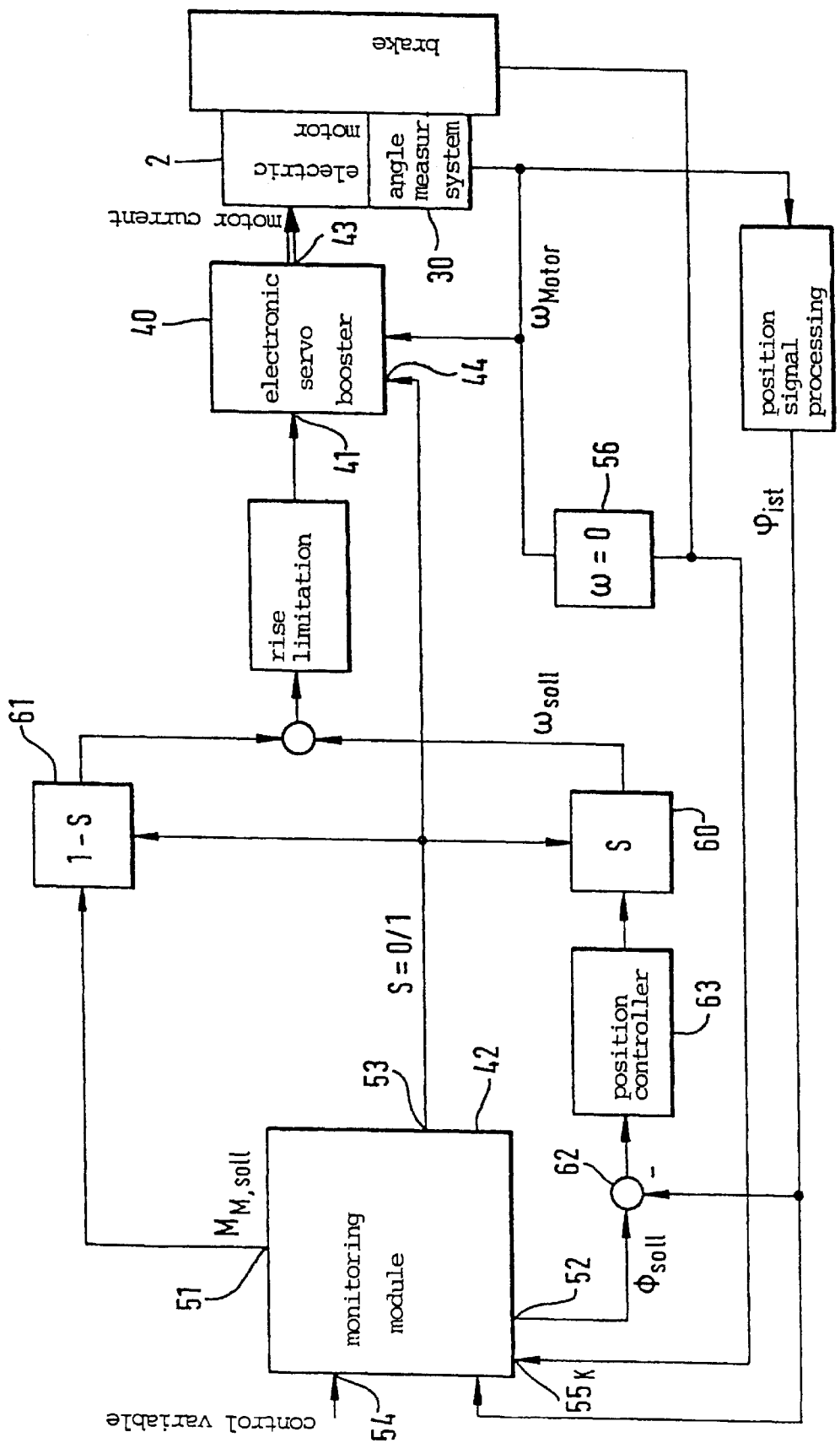
FIG. 2 is a block diagram relating to the actuation of the motor.

The actuation of the electric motor and the associated brake is shown in the FIG. 2 embodiment to determine the current clearance situation and to adjust the clearance. The energization of the electric motor 2 is effected by a so-called electronic servo booster 40. The input 41 of the servo booster is connected to a monitoring module 42 by two paths. Operation of the servo booster may be in two modes. The nominal angular velocity of the motor is applied as an input variable at input 41. An internal final stage supplies the motor current for the electric motor at output 43. The motor current may now be adjusted so that the predetermined angular velocity or the predetermined angular velocity variation is maintained at the input 41. There is an internal feedback of the resolver signal 30 in the servo booster. The servo booster thus performs in the 'motor rotational speed control' mode of operation. A signal S=1 is applied to the control input 44.

The servo booster can also be operated in the 'motor torque control' mode of operation. In this mode, the feedback in the servo booster is internally deactivated so that the strength of the motor current which prevails at output 43 depends only on the quantity at the input 41. This mode is achieved when the value S=0 is applied to the control input 44. In this mode of operation, the nominal value for the motor torque is applied as input quantity to the input 41.

The monitoring module 42 furnishes a nominal motor torque signal $M_{M,soll}$ 51 at a first output and a nominal angle signal $\phi_{soll}$ 52 at a second output.

The control signal S is set to 0 or 1 at a third output 53.

The contact signal is applied at input 55.

The controlling and adjusting system for determining the current clearance situation and adjusting the clearance is activated by a control variable at the input 54 which is set by a superior function unit (not shown) if necessary, for example, if the objective is to sense and re-adjust the clearance.

To be able to adjust a new, adapted clearance, a new neutral position must be determined first of all. It is necessary to generate a contact signal so that the angular position of the motor at the time of generation of the signal can be defined as the new neutral position.

A new neutral position can be determined in various ways. One possibility is described in the following. Initially, the signal S=0 is set at the control output 53. Thus, the servo booster operates in the 'motor torque control' mode of operation. With S=0, a switch 60 in the path between the output 52 of the monitoring module 42 and the servo booster 40 is interrupted. Only the signal at the output 51 is sent by way of the open switch 61 to the input 41 of the servo booster. The latter drives the electric motor 2 such that the friction lining is moved in the direction of the brake disc.

Starting from a previously defined initial value, the nominal torque is increased until a movement is reliably identified by way of the motor speed signal or a defined top limit for the nominal torque is reached.

When the top limit is reached, the brake is obviously in an applied condition. S=1 is set in this case, and the electric motor is restored by an angular variation in a position-controlled manner. A new attempt to determine the neutral position is made after the movement is completed.

When a movement of the motor occurs, the clearance detection is activated after a predetermined minimum angle variation. Taking into account a minimum angle variation prevents an only short-time movement due to static friction or sliding friction effects or due to already prevailing but low load torques. Such a short movement does not permit reliable detection. The angular acceleration is monitored after activation.

Because the servo booster 40 operates in the 'torque control' mode of operation upon application of the brake linings, i.e., is driven at a constant motor torque, the angular velocity of the motor will rise continuously due to the predefined acceleration torque. As soon as the friction element abuts the brake disc, the load of the motor will rise rapidly so that the angular velocity of the motor will be retarded rapidly until standstill. The angular velocity passes a zero value. The zero value can be recorded in the detection device 56 and evaluated as a contact signal, i.e., as an indicator of abutment of the brake linings on the brake disc. The contact signal is applied to the input 55 of the module 42.

Figure 3:
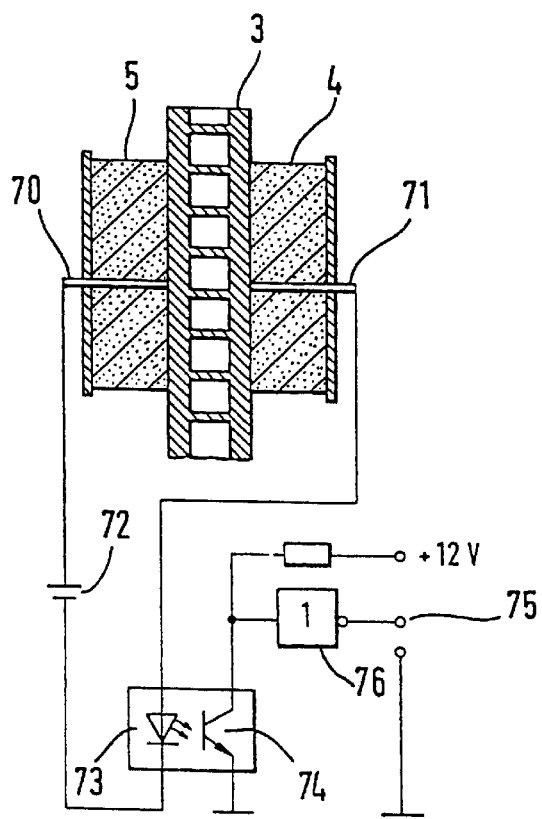
FIGS. 3, 4 are arrangements to identify whether the friction lining bears against the brake disc.

Another possibility includes the arrangement of a contact detector shown in FIG. 3. Both brake linings 3 and 4 have each one contact pin 70, 71 which extend through the respective lining and end with the friction surface of the linings. When the friction linings are applied to the disc 3, the contact pins will also move into contact with the brake disc and close a circuit.

In the FIG. 3 embodiment, the contact pin 70 is connected to a pole of a voltage source 72, and the contact pin 71 is connected to the other pole of a voltage source 72. The circuit includes a light-emitting diode 73 the light of which strikes a light-sensitive element 74.

When the light-sensitive element is rendered conductive, a signal prevails at an output 75 (after an inverting action in an inverter 76) and the signal is evaluated as contact signal K and applied to the input 55.

The galvanic separation of the circuits is necessary because the brake disc is connected to the ground potential of the vehicle electrical system.

Figure 4:
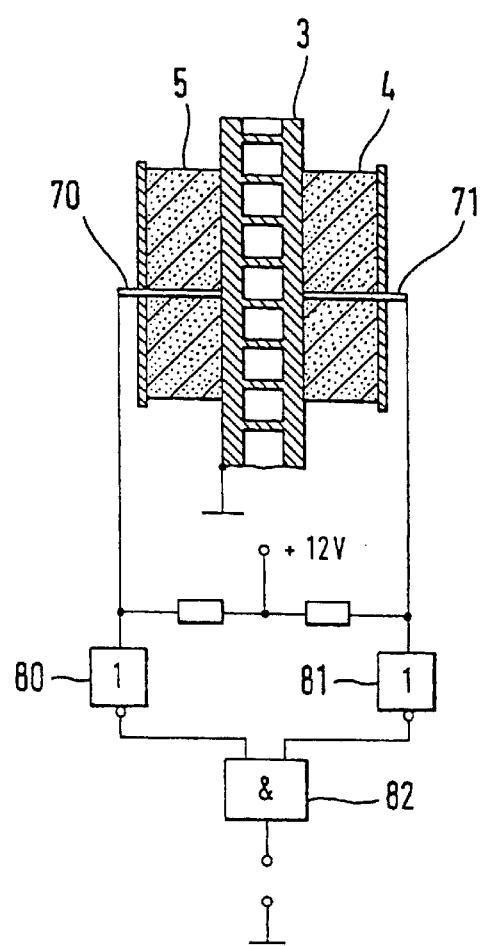

Another wiring possibility is shown in the embodiment of FIG. 4. Each contact pin 70, 71 has its own circuit in the vehicle electrical system. The connection to the ground potential of the vehicle electrical system is made when the brake linings are applied to the brake disc so that both contact pins are connected to ground. Voltage is applied to the corresponding signals in the inverters 80 and 81, which signals are combined to a contact signal in an AND-element 82.

Consequently, a contact signal is in both cases present only when both friction elements bear against the brake disc.

Because the clearance adjustment strategy described hereinabove provides a defined testing cycle with defined test movements, an instantaneous readjustment due to wear is not possible after release of the brake on the basis of this method. Where the objective is to apply the above-mentioned method for the wear readjustment, readjustment must be made separately. It should be taken into consideration that a separate readjustment is not absolutely necessary after each braking operation. The moment when wear readjustment is necessary can be defined by way of relevant signals provided by measurements and their evaluation over a long period.

What is claimed is:

1. A control system for an electromechanical brake which includes a first friction surface operably connected to an element to be braked, a second friction surface provided on a friction element which is movable against the first friction surface by an electric motor having a rotor, wherein the first and the second friction surfaces maintain a predetermined clearance in between each other, a sensor which directly or indirectly senses the angle of rotation of the rotor of the electric motor, a contact-detection means which is able to determine whether the first friction surface bears against the second friction surface and thereupon generates a contact signal, wherein a variation of the angular velocity of the rotor upon application of the first friction surface on the second friction surface is evaluated to determine the rotor angle where the first friction surface touches the second friction surface in a neutral position.

2. A system as claimed in claim 1, wherein for determining the neutral position the motor is driven at a constant torque so that the second friction surface is moved towards the first friction surface, and wherein a zero passage of the angular acceleration is used as a basis for the generation of a contact signal.

3. A system as claimed in claim 1, wherein the motor is adapted to be operated either by a defined rotational speed or with a defined torque.

4. A system as claimed in claim 3, wherein upon response of the contact-detection means the motor is restored to the predetermined clearance by control of the angular velocity.

5. A system as claimed in claim 3, wherein the electric motor is driven by a servo booster which can be switched by a switch element either to a 'torque control' mode of operation or a 'rotational speed control' mode of operation.

6. A system as claimed in claim 5, including a module which issues corresponding switch signals to the servo booster.

7. A control system for an electromechanical brake which includes a first friction surface operably connected to an element to be braked, a second friction surface provided on a friction element which is movable against the first friction surface by an electric motor having a rotor, wherein the first and the second friction surfaces maintain a predetermined clearance in between each other, a sensor which directly or indirectly senses the angle of rotation of the rotor of the electric motor, a contact-detection means which is able to determine whether the first friction surface bears against the second friction surface and thereupon generates a contact signal, wherein a variation of the angular velocity of the rotor upon application of the first friction surface on the second friction surface is evaluated to determine the rotor angle where the first friction surface touches the second friction surface in a neutral position, and wherein for determining the neutral position the motor is driven at a constant torque so that the second friction surface is moved towards the first friction surface, and wherein a zero passage of the angular acceleration is used as a basis for the generation of a contact signal.

* * * * *